United States Patent

Matsutani et al.

(10) Patent No.: US 10,586,328 B2
(45) Date of Patent: Mar. 10, 2020

(54) DYNAMIC ANALYSIS SYSTEM (71) Applicant: Konica Minolta, Inc., Tokyo (JP)

(72) Inventors: Noritsugu Matsutani, Musashino (JP);
Shinsuke Katsuhara, Kodaira (JP);
Hitoshi Futamura, Hachioji (JP); Sho
Noji, Kokubunji (JP)

(73) Assignee: KONICA MINOLTA, INC., Tokyo
(JP)

( * ) Notice: Subject to any disclaimer, the term of this
patent is extended or adjusted under 35
U.S.C. 154(b) by 91 days.

(21) Appl. No.: 15/916,920

(22) Filed: Mar. 9, 2018

(65) Prior Publication Data

US 2018/0260953 A1 Sep. 13, 2018

(30) Foreign Application Priority Data

Mar. 10, 2017 (JP) ................................. 2017-045535

(51) Int. Cl.
G06T 7/00 (2017.01)
G06T 11/60 (2006.01)
G06T 11/00 (2006.01)
G06T 7/11 (2017.01)

(52) U.S. Cl.
CPC .......... G06T 7/0012 (2013.01); G06T 7/0016
(2013.01); G06T 7/11 (2017.01); G06T 11/00
(2013.01); G06T 11/001 (2013.01); G06T
11/60 (2013.01); G06T 2207/10016 (2013.01);
G06T 2207/10116 (2013.01); G06T
2207/20221 (2013.01); G06T 2207/30008
(2013.01); G06T 2207/30061 (2013.01); G06T
2207/30104 (2013.01)

(58) Field of Classification Search
CPC ........ G06T 11/00; G06T 11/001; G06T 11/60;
G06T 2207/10016; G06T 2207/10116;
G06T 2207/20221; G06T 2207/30008;
G06T 2207/30061; G06T 2207/30104;
G06T 7/0012; G06T 7/0016; G06T 7/11
See application file for complete search history.

(56) References Cited

U.S. PATENT DOCUMENTS

2016/0217571 A1* 7/2016 Ben-Haim ............ G06T 7/0012

FOREIGN PATENT DOCUMENTS

WO 2010079689 A1 7/2010

* cited by examiner

Primary Examiner — Nirav G Patel
(74) Attorney, Agent, or Firm — Lucas & Mercanti, LLP (57) ABSTRACT A dynamic analysis system includes a hardware processor. The hardware processor: analyzes a dynamic image for a dynamic state of a living body; generates an analysis result image showing the analysis result; determines, for each pixel of the dynamic image or the analysis result image, whether a pixel value is within a predetermined range of values; classifies the pixels into groups according to the determination result; extracts, as each border pixel, a pixel in a group adjacent to a pixel classified into a different group; generates a border between the groups based on the extracted border pixels; superimposes the border on, between the dynamic image and the analysis result image, an image not subjected to the classification, thereby generating a combined image; and causes an output device to output the combined image.

12 Claims, 5 Drawing Sheets

DYNAMIC ANALYSIS SYSTEM

BACKGROUND

1. Technological Field

This invention relates to a dynamic analysis system.

2. Description of the Related Art

There have been attempts to utilize, for diagnosis, dynamic images of subjects taken with a semiconductor image sensor, such as an FPD (Flat Panel Detector), instead of or in addition to radiation still images of subjects taken with a film/screen or a photostimulable phosphor plate. More specifically, by making use of high responsivity of a semiconductor image sensor in reading/deleting image data, a dynamic state of a subject is imaged (photographed) by continuously emitting pulsed radiation from a radiation source in sync with timing of image reading/deletion by the semiconductor image sensor and performing imaging multiple times per second. A series of images obtained by the imaging are displayed in order, so that doctors can observe a series of movements of the subject.

Further, various techniques for analyzing dynamic images have been proposed. For example, there is described in WO 2010/079689 A1 a technique of obtaining moving image data in which movement of the blood in a living body is captured, calculating luminosity difference values between time-series moving image data, thereby generating a difference image, extracting pixels having the luminosity difference values equal to or more than a first threshold value in the difference image as wave surface pixels, connecting the extracted wave surface pixels to one another, and displaying the same as a bloodstream wave surface.

However, in a conventional analysis result image that shows the result of dynamic analysis, anatomical information (structure shape information) on a subject depicted on the dynamic image is invisible. For example, in WO 2010/079689 A1, because a luminosity difference value image with the bloodstream wave surface displayed thereon is displayed as the analysis result image, vascular shadow and so forth depicted on the original dynamic image are invisible. Hence, the anatomical information needs to be confirmed with another image, and efficiency of interpretation of radiogram is low accordingly.

SUMMARY

Objects of the invention include increasing the efficiency of interpretation of radiogram by making anatomical information depicted on a dynamic image and analysis result information visible simultaneously.

In order to achieve at least one of the objects, according to an aspect of the invention, there is provided a dynamic analysis system including a hardware processor that: analyzes a dynamic image obtained by imaging of a dynamic state of a living body with radiation for the dynamic state on a pixel basis or a block basis, the block being constituted of a plurality of pixels; generates an analysis result image showing a result of the analysis; determines, for each pixel of pixels of the dynamic image or the analysis result image, whether a pixel value is within a predetermined range of values; classifies the pixels into groups according to a result of the determination; extracts, as each of border pixels, a pixel in, among the groups, a group adjacent to a pixel classified into a different group; generates a border between the groups based on the extracted border pixels; superimposes the border on, between the dynamic image and the analysis result image, an image not subjected to the classification, thereby generating a combined image; and causes an output device to output the combined image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention, wherein.

DETAILED DESCRIPTION OF EMBODIMENTS

Hereinafter, one or more embodiments of the invention will be described in detail with reference to the drawings. However, the scope of the invention is not limited to the disclosed embodiments.

First Embodiment

[Configuration of Dynamic Analysis System 100]

First, the configuration of a first embodiment is described.

Figure 1:
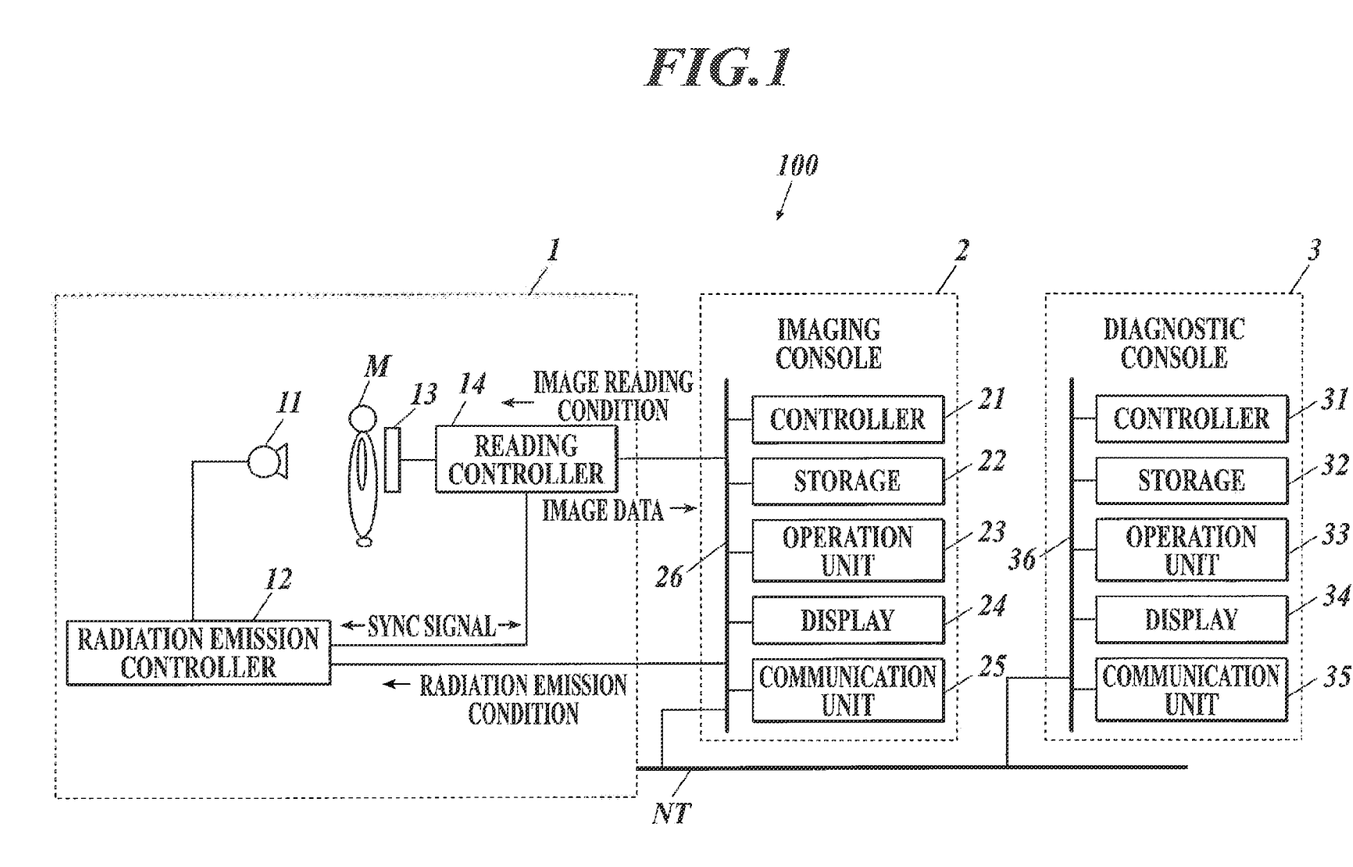
FIG. 1 shows the overall configuration of a dynamic analysis system according to embodiments of the invention.

FIG. 1 shows the overall configuration of a dynamic analysis system 100 according to the first embodiment.

As shown in FIG. 1, the dynamic analysis system 100 includes: an imager 1; an imaging console 2 connected with the imager 1 via a communication cable or the like; and a diagnostic console 3 connected with the imaging console 2 via a communication network NT, such as a LAN (Local Area Network). These apparatuses of the dynamic analysis system 100 are in conformity with DICOM (Digital Image and Communications in Medicine) standard and communicate with one another in conformity with DICOM.

[Configuration of Imager 1]

The imager 1 is an imager that images a cyclic dynamic state. Examples of the cyclic dynamic state include: change in shape of the lung fields by expansion and contraction of the lung fields with breathing; and pulsation of the heart. Dynamic imaging (kinetic imaging) is performed by repeatedly emitting pulsed radiation, such as pulsed X-rays, to a living body as a subject at predetermined time intervals (pulse emission) or continuously emitting radiation without a break to a subject at a low dose rate (continuous emission), thereby obtaining a plurality of images showing the dynamic state. A series of images obtained by dynamic imaging is called a dynamic image. Images constituting a dynamic image are called frame images. In the embodiments described hereinafter, dynamic imaging of a chest is performed by pulse emission as an example.

A radiation source 11 is disposed to face a radiation detector 13 with a subject M (examinee) interposed therebetween, and emits radiation (X-rays) to the subject M under the control of a radiation emission controller 12.

The radiation emission controller 12 is connected with the imaging console 2, and controls the radiation source 11 on the basis of radiation emission conditions input from the imaging console 2 so as to perform imaging with radiation (radiation imaging). The radiation emission conditions input from the imaging console 2 include a pulse rate, a pulse width, a pulse interval, the number of frames (frame images) to be taken by one imaging, a value of current of an X-ray tube, a value of voltage of the X-ray tube, and a type of added filter. The pulse rate is the number of times radiation is emitted per second, and matches the frame rate described below. The pulse width is duration of radiation emission per time. The pulse interval is a period of time from the start of one radiation emission to the start of the next radiation emission, and matches the frame interval described below.

The radiation detector 13 is constituted of a semiconductor image sensor, such as an FPD. The FPD is constituted of detection elements (pixels) arranged at predetermined points on a substrate, such as a glass substrate, in a matrix. The detection elements detect radiation (intensity of radiation) that has been emitted from the radiation source 11 and passed through at least the subject M, convert the detected radiation into electric signals, and accumulate the electric signals therein. The pixels are provided with switches, such as TFTs (Thin Film Transistors). There are an indirect conversion type FPD that converts X-rays into electric signals with photoelectric conversion element(s) via scintillator(s) and a direct conversion type FPD that directly converts X-rays into electric signals. Either of them can be used.

The radiation detector 13 is disposed to face the radiation source 11 with the subject M interposed therebetween.

A reading controller 14 is connected with the imaging console 2. The reading controller 14 controls the switches of the pixels of the radiation detector 13 on the basis of image reading conditions input from the imaging console 2 to switch the pixels to read the electric signals accumulated in the pixels, thereby reading the electric signals accumulated in the radiation detector 13 and obtaining image data. This image data is a frame image(s). The reading controller 14 outputs the obtained frame images to the imaging console 2. The image reading conditions include a frame rate, a frame interval, a pixel size, and an image size (matrix size). The frame rate is the number of frame images to be obtained per second, and matches the pulse rate described above. The frame interval is a period of time from the start of one frame image obtaining action to the start of the next frame image obtaining action, and matches the pulse interval described above.

The radiation emission controller 12 and the reading controller 14 are connected to one another, and exchange sync signals so as to synchronize radiation emission actions with image reading actions.

[Configuration of Imaging Console 2]

The imaging console 2 outputs the radiation emission conditions and the image reading conditions to the imager 1 so as to control the radiation imaging and the radiation image reading actions performed by the imager 1, and also displays the dynamic image obtained by the imager 1 so that a radiographer, such as a radiologist, can check if positioning has no problem, and also can determine if the dynamic image is suitable for diagnosis.

The imaging console 2 includes, as shown in FIG. 1, a controller 21, a storage 22, an operation unit 23, a display 24 and a communication unit 25. These units or the like are connected to one another via a bus 26.

The controller 21 includes a CPU (Central Processing Unit) and a RAM (Random Access Memory). The CPU of the controller 21 reads a system program and various process programs stored in the storage 22 in response to operations with the operation unit 23, opens the read programs in the RAM, and performs various processes, such as the below-described imaging control process, in accordance with the opened programs, thereby performing concentrated control of actions of the units or the like of the imaging console 2 and the radiation emission actions and the reading actions of the imager 1.

The storage 22 is constituted of a nonvolatile semiconductor memory, a hard disk or the like. The storage 22 stores therein various programs to be executed by the controller 21, parameters necessary to perform processes of the programs, data, such as process results, and so forth. For example, the storage 22 stores therein a program for the imaging control process shown in FIG. 2. The storage 22 also stores therein the radiation emission conditions and the image reading conditions for respective imaging sites to be examined (here, the chest). The programs are stored in the form of computer readable program code, and the controller 21 acts in accordance with the program code.

The operation unit 23 includes: a keyboard including cursor keys, number input keys and various function keys; and a pointing device, such as a mouse, and outputs, to the controller 21, command signals input by key operations on the keyboard or by mouse operations. The operation unit 23 may have a touchscreen on the display screen of the display 24. In this case, the operation unit 23 outputs command signals input via the touchscreen to the controller 21.

The display 24 is constituted of a monitor, such as an LCD (Liquid Crystal Display) or a CRT (Cathode Ray Tube), and displays thereon input commands from the operation unit 23, data and so forth in accordance with commands of display signals input from the controller 21.

The communication unit 25 includes a LAN adapter, a modem and a TA (Terminal Adapter), and controls data exchange with apparatuses connected to the communication network NT.

[Configuration of Diagnostic Console 3]

The diagnostic control 3 is an apparatus that obtains the dynamic image from the imaging console 2, and displays the obtained dynamic image and/or the analysis result of the dynamic image to help a doctor(s) make a diagnosis.

The diagnostic console 3 includes, as shown in FIG. 1, a controller 31, a storage 32, an operation unit 33, a display 34 and a communication unit 35. These units or the like are connected to one another via a bus 36.

The controller 31 includes a CPU (hardware processor) and a RAM. The CPU of the controller 31 reads a system program and various process programs stored in the storage 32 in response to operations with the operation unit 33, opens the read programs in the RAM, and performs various processes, such as the below-described dynamic analysis process A, in accordance with the opened programs, thereby performing concentrated control of actions of the units or the like of the diagnostic console 3.

The storage 32 is constituted of a nonvolatile semiconductor memory, a hard disk or the like. The storage 32 stores therein various programs, including a program for the dynamic analysis process A, to be executed by the controller 31, parameters necessary to perform processes of the programs, data, such as process results, and so forth. The programs are stored in the form of computer readable program code, and the controller 31 acts in accordance with the program code.

The storage 32 stores therein the dynamic image obtained by imaging and its analysis result image correlated with patient information (e.g. patient ID, name, height, weight, age, sex, etc.) and examination information (e g examination ID, examination date, site to be examined (here, the chest), type of function to be diagnosed (e.g. ventilation, perfusion, etc.), etc.).

The operation unit 33 includes: a keyboard including cursor keys, number input keys and various function keys; and a pointing device, such as a mouse, and outputs, to the controller 31, command signals input by key operations on the keyboard or by mouse operations. The operation unit 33 may have a touchscreen on the display screen of the display 34. In this case, the operation unit 33 outputs command signals input via the touchscreen to the controller 31.

The display 34 is constituted of a monitor, such as an LCD or a CRT, and performs various types of display in accordance with commands of display signals input from the controller 31.

The communication unit 35 includes a LAN adapter, a modem and a TA, and controls data exchange with apparatuses connected to the communication network NT.

[Actions of Dynamic Analysis System 100]

Next, actions of the dynamic analysis system 100 according to this embodiment are described.

[Actions of Imager 1 and Imaging Console 2]

First, imaging actions that are performed by the imager 1 and the imaging console 2 are described.

Figure 2:
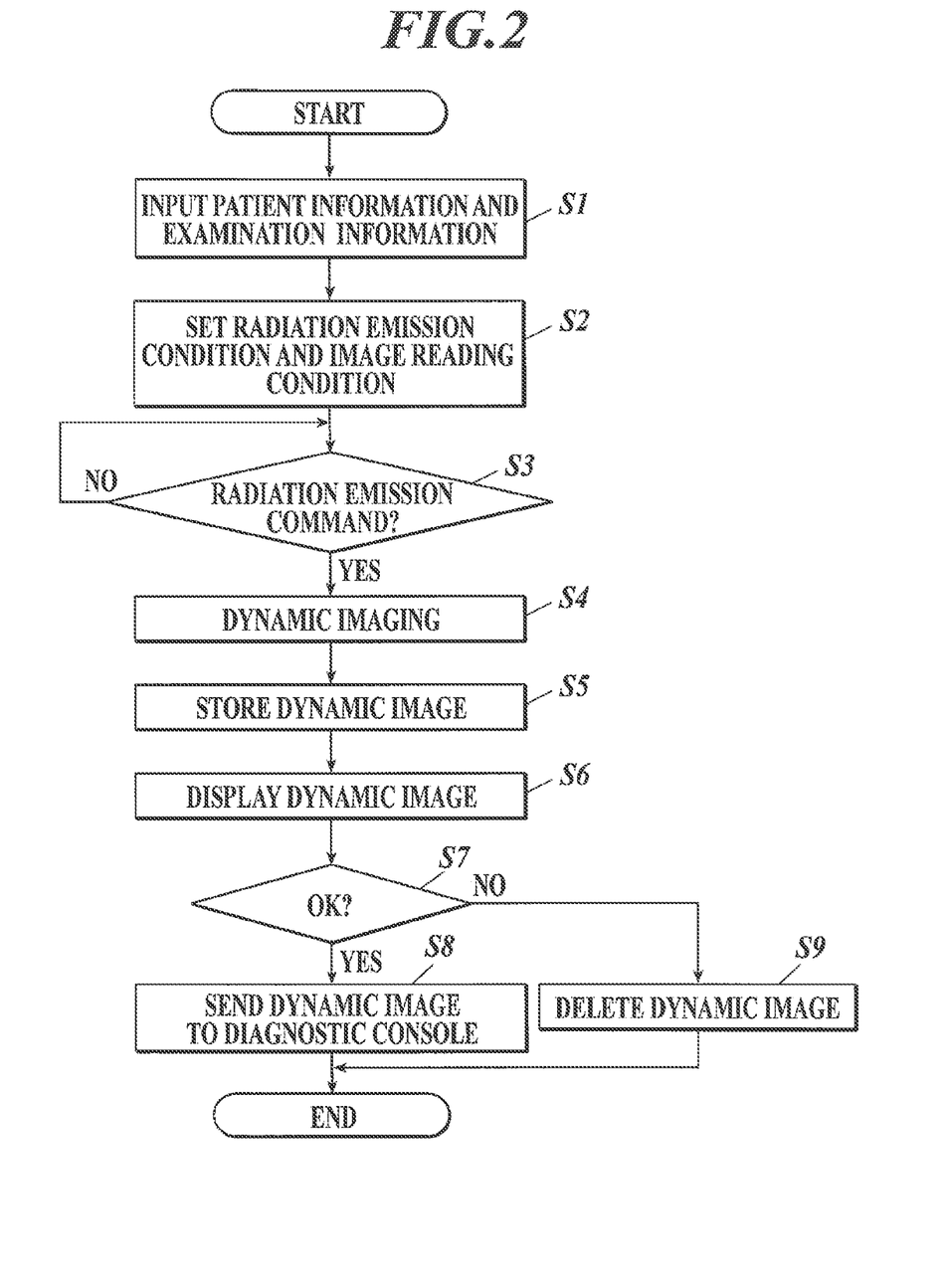
FIG. 2 is a flowchart of an imaging control process that is performed by a controller of an imaging console shown in FIG. 1.

FIG. 2 shows the imaging control process that is performed by the controller 21 of the imaging console 2. The imaging control process is performed by the controller 21 in cooperation with the program stored in the storage 22.

First, a radiographer operates the operation unit 23 of the imaging console 2 so as to input patient information on an examinee (subject M), and examination information on an examination to be performed on the examinee (Step S1).

Next, the controller 21 reads radiation emission conditions from the storage 22 so as to set them in the radiation emission controller 12, and also reads image reading conditions from the storage 22 so as to set them in the reading controller 14 (Step S2).

Next, the controller 21 waits for a radiation emission command to be input by the radiographer operating the operation unit 23 (Step S3). Here, the radiographer places the subject M between the radiation source 11 and the radiation detector 13 and performs positioning. Further, the radiographer instructs the examinee (subject M) about how to breathe, for example, instructs the examinee to relax and encourages him/her to do quiet breathing. If the type of the function to be diagnosed is ventilation, the radiographer may instruct the examinee to do quiet breathing, whereas if the type of the function to be diagnosed is perfusion, the radiographer may instruct the examinee to stop breathing. When preparations for imaging are complete, the radiographer operates the operation unit 23 so as to input the radiation emission command.

When receiving the radiation emission command input through the operation unit 23 (Step S3; YES), the controller 21 outputs an imaging start command to the radiation emission controller 12 and the reading controller 14 to start dynamic imaging (Step S4). That is, the radiation source 11 emits radiation at pulse intervals set in the radiation emission controller 12, and accordingly the radiation detector 13 obtains (generates) a series of frame images.

When imaging for a predetermined number of frame images finishes, the controller 21 outputs an imaging end command to the radiation emission controller 12 and the reading controller 14 to stop the imaging actions. The number of frame images to be taken covers at least one breathing cycle.

The frame images obtained by imaging are successively input to the imaging console 2 and stored in the storage 22, the frame images being correlated with respective numbers indicating what number in the imaging order the respective frame images have been taken (frame numbers) (Step S5), and also displayed on the display 24 (Step S6). The radiographer checks the positioning or the like with the displayed dynamic image, and determines whether the dynamic image obtained by dynamic imaging is suitable for diagnosis (Imaging OK) or re-imaging is necessary (Imaging NG). Then, the radiographer operates the operation unit 23 so as to input the determination result.

When the determination result "Imaging OK" is input by the radiographer performing a predetermined operation with the operation unit 23 (Step S7; YES), the controller 21 attaches, to the respective frame images of the dynamic image obtained by dynamic imaging (e.g. writes, in the header region of the image data in DICOM), information such as an ID to identify the dynamic image, the patient information, the examination information, the radiation emission conditions, the image reading conditions, and the respective numbers indicating what number in the imaging order the respective frame images have been taken (frame numbers), and sends the same to the diagnostic console 3 through the communication unit 25 (Step S8), and then ends the imaging control process. On the other hand, when the determination result "Imaging NG" is input by the radiographer performing a predetermined operation with the operation unit 23 (Step S7; NO), the controller 21 deletes the frame images of the dynamic image from the storage 22 (Step S9), and then ends the imaging control process. In this case, re-imaging is necessary.

[Actions of Diagnostic Console 3]

Next, actions of the diagnostic console 3 are described.

Figure 3:
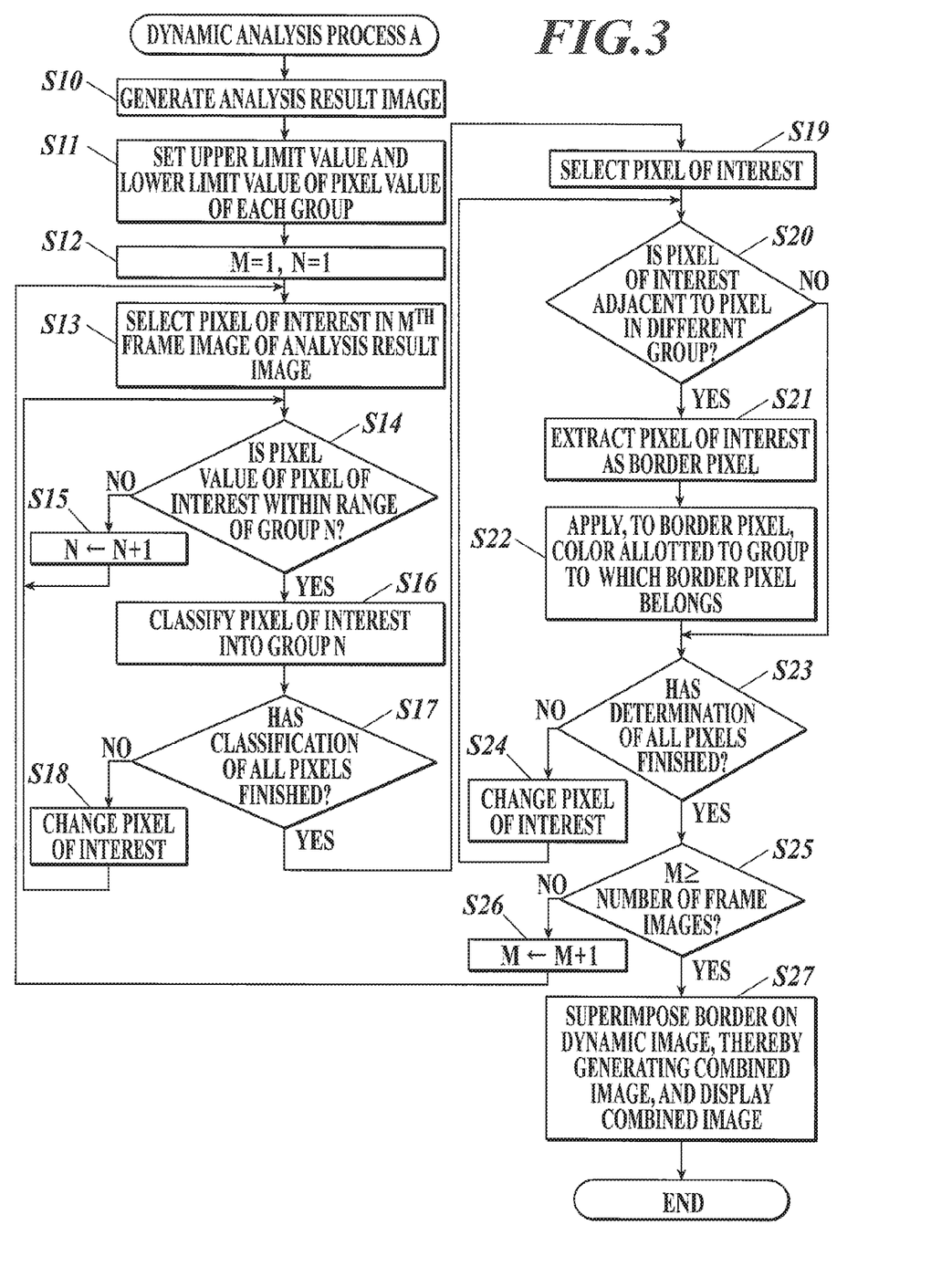
FIG. 3 is a flowchart of a dynamic analysis process A that is performed by a controller of a diagnostic console shown in FIG. 1 according to a first embodiment.

In the diagnostic console 3, when receiving a series of frame images of a dynamic image from the imaging console 2 through the communication unit 35, the controller 31 performs the dynamic analysis process A shown in FIG. 3 in cooperation with the program stored in the storage 32.

Hereinafter, the flow of the dynamic analysis process A is described with reference to FIG. 3.

First, the controller 31 performs dynamic analysis of the lung field regions on the basis of the series of frame images of the dynamic image, and generates an analysis result image constituted of frame images indicating the analysis result of the dynamic state (Step S10).

The analysis result image is obtained by analysis of the dynamic image on a pixel-to-pixel basis (i.e. a pixel basis) or on a block-to-block basis (i.e. a block basis) for the function (ventilation or perfusion) to be diagnosed, the block being constituted of a plurality of pixels, and the signal values of the pixels thereof indicate the result of the dynamic analysis. Although the specific analysis technique for obtaining the analysis result image(s) is not particularly limited, the (1) to (3) below can be used, for example. In the (1) to (3) below, analysis of a dynamic image is performed on a block-to-block basis, the block (small region) being constituted of a plurality of pixels in the lung field regions, but may be performed on a pixel-to-pixel basis. Note that a pixel of a dynamic image means corresponding pixels between frame images of the dynamic image, and a block of a dynamic image means corresponding blocks (at the same pixel position) between frame images of the dynamic image.

(1) If the function to be diagnosed is perfusion, the technique described in JP 2012-239796 A can be used, for example. That is, as a perfusion analysis result image, a moving image may be generated by calculating, for each small region of a series of frame images, a cross correlation coefficient of a pulsation signal waveform with a perfusion signal waveform while shifting the perfusion signal waveform by one frame interval (in the time direction) with respect to the pulsation signal waveform obtained from the start of imaging, and arranging images each being one frame in which the cross correlation coefficients are shown in the respective small regions, wherein the cross correlation coefficients for the respective small regions are calculated each time the perfusion signal waveform is shifted by one frame interval.

The perfusion signal waveform can be obtained by performing high-pass filtering in the time direction (e.g. a lower-limit cutoff frequency of 0.8 Hz) on each small region of a series of frame images, calculating a representative value (the mean, the maximum, etc.) of the signal values of the pixels of each small region, and obtaining a waveform showing temporal change in the calculated representative value.

As the pulsation signal waveform, any of the following waveforms can be used.
(a) Waveform that shows temporal change in signal value of ROI (region of interest) designated in heart region (or main artery region)
(b) Signal waveform obtained by reversing waveform of (a)
(c) Cardiac signal waveform obtained from electrocardiographic sensor
(d) Signal waveform that shows motion (change in position) of heart wall The cross correlation coefficient can be obtained by the following [Equation 1].

$$C = \frac{1}{J}\sum_{j=1}^{J} \frac{\{A(j) - m_A\}\{B(j) - m_B\}}{\sigma_A \sigma_B}$$ [Equation 1]

$$m_A = \frac{1}{J}\sum_{j=1}^{J} A(j),\ m_B = \frac{1}{J}\sum_{j=1}^{J} B(j)$$

$$\sigma_A = \sqrt{\frac{1}{J}\sum_{j=1}^{J} \{A(j) - m_A\}^2}$$

$$\sigma_B = \sqrt{\frac{1}{J}\sum_{j=1}^{J} \{B(j) - m_B\}^2}$$

C: Cross correlation coefficient
$A(j)$: Signal value of $j^{th}$ signal of all signals J included in pulsation signal waveform
$m_A$: Mean of signal values of all signals included in pulsation signal waveform
$\sigma_A$: Standard deviation of all signals included in pulsation signal waveform
$B(j)$: Signal value of $j^{th}$ signal of all signals J included in output signal waveform of small region
$m_B$: Mean of signal values of all signals included in output signal waveform of small region
$\sigma_B$: Standard deviation of all signals included in output signal waveform of small region (2) If the function to be diagnosed is perfusion, as described in JP 2013-81579 A, as a perfusion analysis result image, a moving image may be generated by performing high-pass filtering in the time direction (e.g. a lower-limit cutoff frequency of 0.8 Hz) on each small region of a series of frame images, calculating, for each small region, a difference value in representative value (the mean, the maximum, etc.) of the signal values of the pixels between adjacent frame images of each possible pair, and arranging images as frames in chronological order, each image being one frame in which the calculated difference values between the adjacent frame images are shown in the respective small regions. The inter-frame difference images (constituting the moving image) generated by the above technique are images from which signal change due to ventilation in each small region has been removed and which show signal change due to perfusion in each small region.

(3) If the function to be diagnosed is ventilation, as described in JP 2013-81579 A, as a ventilation analysis result image, a moving image may be generated by performing low-pass filtering in the time direction (e.g. a higher-limit cutoff frequency of 0.8 Hz) on each small region of a series of frame images, calculating, for each small region, a difference value in representative value (the mean, the maximum, etc.) of the signal values of the pixels between adjacent frame images of each possible pair, and arranging images as frames in chronological order, each image being one frame in which the calculated difference values between the adjacent frame images are shown in the respective small regions. The inter-frame difference images (constituting the moving image) generated by the above technique are images from which signal change due to perfusion in each small region has been removed and which show signal change due to ventilation in each small region.

Next, the controller 31 sets, on the basis of the pixel values of the analysis result image, the upper limit value and the lower limit value of pixel values of each of groups that are used for grouping of the pixels of the analysis result image (Step S11).

For example, the controller 31 obtains the maximum value and the minimum value among the pixel values of all the frame images of the analysis result image, divides the range from the maximum value to the minimum value into n groups, and sets the upper limit value and the lower limit value of pixel values that belong to each group. For example, if the upper limit value and the lower limit value of pixel values of each group are preset, a group(s) that is outside the range of the pixel values of the analysis result image may be set, which may lead to poor grouping. Meanwhile, setting the upper limit value and the lower limit value of the pixel values of each group on the basis of the pixel values of the analysis result image enables classification of the pixels of the analysis result image into n groups.

Next, the controller 31 sets "1" to the variable M and "1" to the variable N (Step S12) and selects a pixel of interest in the $M^{th}$ frame image of the analysis result image (Step S13). The controller 31 selects the pixel of interest in order starting from, for example, the upper left pixel.

Next, the controller 31 determines whether the pixel value of the pixel of interest is within the range of the group N (Step S14).

When determining that the pixel value of the pixel of interest is not within the range of the group N (Step 14; NO), the controller 31 increments N by 1 (i.e. adds 1 to N) (Step S15), and returns to Step S14.

On the other hand, when determining that the pixel value of the pixel of interest is within the range of the group N (Step 14; YES), the controller 31 classifies the pixel of interest into the group N (Step S16), and proceeds to Step S17.

In Step S17, the controller 31 determines whether the classification (grouping) of all the pixels of the $M^{th}$ frame image has finished (Step S17).

When determining that the classification (grouping) of all the pixels of the $M^{th}$ frame image (all the pixels of the lung field regions to be analyzed) has not finished yet (Step S17; NO), the controller 31 changes the pixel of interest (Step S18), and returns to Step S14.

On the other hand, when determining that the classification (grouping) of all the pixels of the $M^{th}$ frame image has finished (Step S17; YES), the controller 31 selects a pixel of interest (Step S19). The controller 31 selects the pixel of interest in order starting from, for example, the upper left pixel.

Next, the controller 31 determines whether the pixel of interest is adjacent to a pixel in a different group (Step S20). When determining that the pixel of interest is not adjacent to a pixel in a different group (Step S20; NO), the controller 31 proceeds to Step S23.

On the other hand, when determining that the pixel of interest is adjacent to a pixel in a different group (Step S20; YES), the controller 31 extracts the pixel of interest as a border pixel (Step S21), applies, to the border pixel, a color allotted to the group to which the pixel value of the border pixel belongs, thereby generating a border (Step S22), and proceeds to Step S23. For example, a darker color is allotted to a group of higher pixel values. Conversely, a lighter color is allotted to a group of lower pixel values.

In Step S23, the controller 31 determines whether the determination (determination about whether the pixel of interest and its adjacent pixel are in different groups) of all the pixels has finished (Step S23).

When determining that the determination of all the pixels has not finished yet (Step S23; NO), the controller 31 changes the pixel of interest (Step S24), and returns to Step S20.

On the other hand, when determining that the determination of all the pixels has finished (Step S24; YES), the controller 31 determines whether the variable M is equal to or more than the number of frame images of the analysis result image (Step S25).

When determining that the variable M is not equal to or more than the number of frame images of the analysis result image (Step S25; NO), the controller 31 increments the variable M by 1 (adds 1 to M) (Step S26), and returns to Step S13.

On the other hand, when determining that the variable M is equal to or more than the number of frame images of the analysis result image (Step S25; YES), the controller 31 superimposes, on the frame images of the dynamic image, the border pixels on their corresponding frame images of the analysis result image, thereby generating a combined image, and causes the display 34 to display the combined image (Step S27), and ends the dynamic analysis process A. Because border pixels are adjacent to one another, it is preferable that one of two border pixels adjustment to one another, e.g. a border pixel having a higher pixel value, be displayed with a color.

Figure 4:
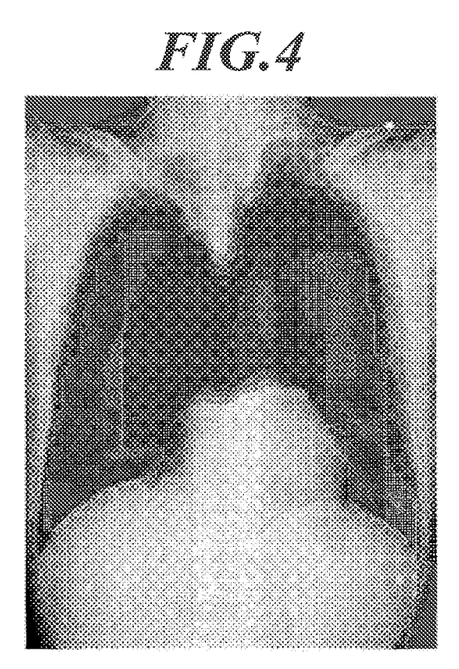
FIG. 4 shows an example of an analysis result image.
Figure 5:
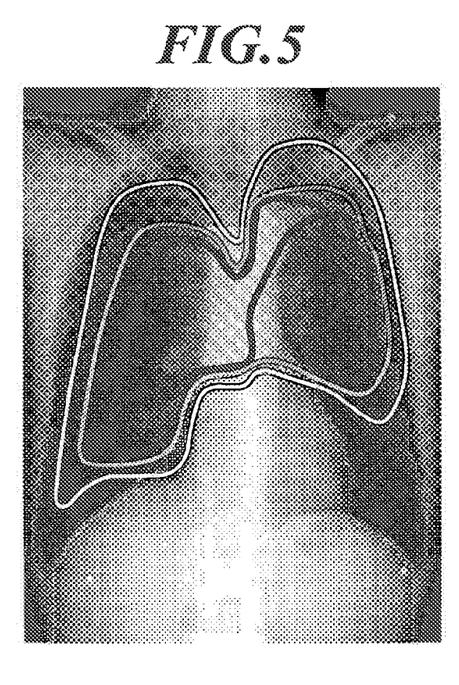
FIG. 5 shows an example of an image that is generated in the dynamic analysis process A on the basis of the analysis result image shown in FIG. 4 and its dynamic image.

FIG. 4 shows an example of the analysis result image, and FIG. 5 shows an example of the image displayed in Step S27 (the image generated on the basis of the analysis result image shown in FIG. 4 and its dynamic image).

In the analysis result image shown in FIG. 4, the anatomical information depicted on the dynamic image is invisible. On the other hand, as shown in FIG. 5, in the image displayed in Step S27, the border pixels in groups into which the pixels of the analysis result image are classified according to their pixel values are displayed on the dynamic image with colors for the groups to which the respective border pixels belong (i.e. color-coded). This allows a user to visually confirm the anatomical information depicted on the dynamic image and the analysis result information simultaneously, and can increase the efficiency of interpretation of radiogram accordingly.

Second Embodiment

Next, a second embodiment of the invention is described.

Figure 6:
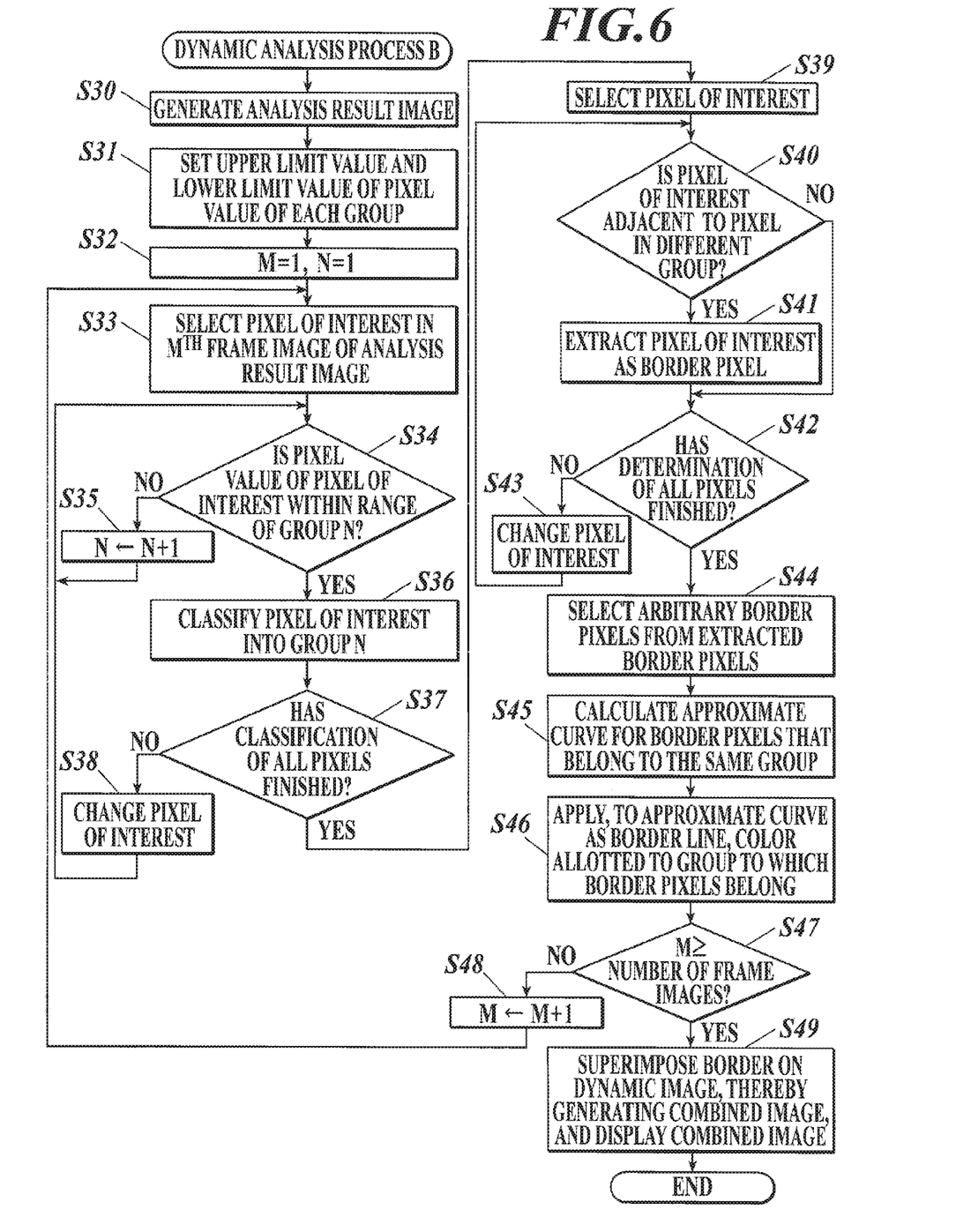
FIG. 6 is a flowchart of a dynamic analysis process B that is performed by the controller of the diagnostic console shown in FIG. 1 according to a second embodiment.

The configuration of the second embodiment is the same as that described in the first embodiment except that, in the second embodiment, a program for a dynamic analysis process B is stored in the storage 32 of the diagnostic console 3. Hence, description of the configuration is not repeated here, and actions of the second embodiment are described hereinafter.

First, the imager 1 and the imaging console 2 perform dynamic imaging, thereby generating a dynamic image, and the imaging console 2 sends a series of frame images of the dynamic image to the diagnostic console 3.

In the diagnostic console 3, when receiving the series of frame images of the dynamic image from the imaging console 2 through the communication unit 35, the controller 31 performs the dynamic analysis process B shown in FIG. 6 in corporation with the program stored in the storage 32.

Hereinafter, the flow of the dynamic analysis process B is described with reference to FIG. 6.

First, the controller 31 performs processes in Steps S30 to S41, thereby extracting border pixels in the $M^{th}$ frame image of the analysis result image. The processes in Steps S30 to S41 are the same as those in Steps S10 to S21 in FIG. 3, respectively. Hence, descriptions thereof are not repeated here.

In Step S42, the controller 31 determines whether the determination (determination about whether the pixel of interest and its adjacent pixel are in different groups) of all the pixels has finished (Step S42).

When determining that the determination of all the pixels has not finished yet (Step S42; NO), the controller 31 changes the pixel of interest (Step S43), and returns to Step S40.

On the other hand, when determining that the determination of all the pixels has finished (Step S42; YES), the controller 31 selects arbitrary border pixels from the border pixels set in the $M^{th}$ frame image (Step S44). For example, the controller 31 selects border pixels at intervals of a predetermined number of pixels from consecutive border pixels.

The controller 31 calculates each approximate curve for border pixels that belong to the same group among the selected border pixels (Step S45), and applies, to the calculated approximate curve as a border line, a color allotted to the group to which the border pixels belong (Step S46). In Step S45, a closed space enclosing a pixel region of the pixels in the same group can be generated, for example, by repeating the work of selecting a plurality of pixels from the border pixels that belong to the same group and generating an approximate curve, while shifting the working point. The approximate curve(s) can be obtained by the least square method, for example. The border pixels that belong to the same group are connected to one another with an approximate curve preferably, but may be connected to one another with a straight line.

Next, the controller 31 determines whether the variable M is equal to or more than the number of frame images of the analysis result image (Step S47).

When determining that the variable M is not equal to or more than the number of frame images of the analysis result image (Step S47; NO), the controller 31 increments the variable M by 1 (adds 1 to M) (Step S48), and returns to Step S33.

On the other hand, when determining that the variable M is equal to or more than the number of frame images of the analysis result image (Step S47; YES), the controller 31 superimposes, on the frame images of the dynamic image, the border lines on their corresponding frame images of the analysis result image, thereby generating a combined image, and causes the display 34 to display the combined image (Step S49), and ends the dynamic analysis process B. Because border lines are adjacent to one another, it is preferable that one of two border lines adjustment to one another, e.g. a border line having a higher pixel value(s), be displayed with a color.

In the second embodiment, colors are not applied to border pixels themselves, but applied to border lines obtained by smoothing the border pixels with approximate curves. Hence, in addition to the same effects as those in the first embodiment, the second embodiment has an effect of displaying more smooth and visible borders between groups having different pixel values.

In Step S27 in FIG. 3 and Step S49 in FIG. 6, it is preferable that the controller 31 cause the display 34 to display the combined image with a numerical value(s) (e.g. pixel values of the border pixels) on the border(s). The numerical value(s) is for the group(s) to which the border pixels on the border(s) belong. This makes it easier for a user to understand the analysis result.

In the image displayed on the display 34 in Step S27 in FIG. 3 and Step S49 in FIG. 6, if an arbitrary border is specified with a cursor being put on the border through the operation unit 33, it is preferable that the controller 31 cause the display 34 to highlight the specified border and a border(s) in the same group as the specified border (e.g. make them bright, display them with a color (or a hue) different from the colors used for displaying borders). This makes it easy for a user to recognize regions that belong to the group which includes the specified border. For example, if a user specifies a border in a group in the right lung field, all the borders in the same group, which include a border(s) in the left lung field, are made to be bright, and hence a user can readily recognize even a region in the left lung field, the region being in the same group as the border specified in the right lung field.

Further, in the image displayed on the display 34 in Step S27 in FIG. 3 and Step S49 in FIG. 6, if an arbitrary border is specified with a cursor being put on the border through the operation unit 33, the controller 31 may extract borders in the same group as the specified border from the respective frame images of the analysis result image, superimpose all the borders on one frame image of the dynamic image, thereby generating a combined image, and causes the display 34 to display the combined image. This can display temporal change in the analyzed function on one image, and enables efficient interpretation of radiogram and diagnosis accordingly.

Further, in the first and second embodiments, the pixel values of the analysis result image are classified into groups, colors are applied to borders (border pixels or border lines) between different groups, and the borders are superimposed on the dynamic image. Alternatively, the pixel values of the dynamic image may be classified into groups, colors may be applied to borders between different groups, and the borders may be superimposed on the analysis result image.

For example, if the above classification (grouping) of pixels is performed on a dynamic chest image, contours of anatomical structures (e.g. bones, vascular shadow, etc.) appear as borders between different groups. Hence, the procedure of applying colors to the borders on the dynamic image, superimposing the colored borders on its analysis result image, thereby generating a combined image, and displaying the combined image on the display 34 allows a user to visually confirm the anatomical information depicted on the dynamic image and the analysis result information simultaneously, and can increase the efficiency of interpretation of radiogram accordingly.

In the above, the first and second embodiments of the invention are described. However, the matters described in the above embodiments are some of preferred examples of the invention, and not intended to limit the invention.

For example, in the above embodiments, the range of pixel values that belong to each group is set on the basis of the pixel values of, between the dynamic image and its analysis result image, the image, the pixel values of which are classified into groups, so that the borders are generated. However, this is not a limit. The range of pixel values that belong to each group may be set and stored in the storage 32 beforehand, for example.

Further, although the display 34 is used as an output device in the above embodiments, another output device, such as a printer, may be used.

Further, although the CPU that performs the dynamic analysis process and the output device are included in a single apparatus in the above embodiments, these functions (devices) may be included in separate apparatuses.

Further, for example, in the above, as a computer readable medium for the programs of the invention, a hard disk, a nonvolatile semiconductor memory or the like is used. However, the computer readable medium is not limited thereto, and may be a portable recording/storage medium, such as a CD-ROM. Further, as a medium to provide data of the programs of the invention, a carrier wave can be used.

In addition to the above, the specific configurations/components and the specific actions of the apparatuses of the dynamic analysis system can also be appropriately modified without departing from the spirit of the invention.

Although embodiments of the invention have been described and illustrated in detail, the disclosed embodiments are made for purposes of illustration and example only and not limitation. The scope of the invention should be interpreted by terms of the appended claims.

The entire disclosure of Japanese Patent Application No. 2017-045535 filed on Mar. 10, 2017 is incorporated herein by reference in its entirety.

What is claimed is:

1. A dynamic analysis system comprising a hardware processor that:
    analyzes a dynamic image obtained by imaging of a dynamic state of a living body with radiation for the dynamic state on a pixel basis or a block basis, the block being constituted of a plurality of pixels;
    generates an analysis result image showing a result of the analysis;

determines, for each pixel of pixels of the dynamic image or the analysis result image, whether a pixel value is within a predetermined range of values;

classifies the pixels into groups according to a result of the determination;

extracts, as each of border pixels, a pixel in, among the groups, a group adjacent to a pixel classified into a different group;

generates a border between the groups based on the extracted border pixels;

superimposes the border on, between the dynamic image and the analysis result image, an image not subjected to the classification, thereby generating a combined image; and causes an output device to output the combined image.

2. The dynamic analysis system according to claim 1, wherein to each group of the groups, an upper limit value and a lower limit value of pixels that belong to the group are set, and the hardware processor:
determines, for each pixel of the pixels of the dynamic image or the analysis result image, whether the pixel value is within the range from the upper limit value to the lower limit value of any one of the groups; and classifies the pixels into the groups according to the result of the determination.

3. The dynamic analysis system according to claim 2, wherein the hardware processor sets the upper limit value and the lower limit value of each group of the groups based on pixel values of, between the dynamic image and the analysis result image, an image to be subjected to the classification.

4. The dynamic analysis system according to claim 1, wherein the hardware processor applies a color to the extracted border pixels, thereby generating the border between the groups.

5. The dynamic analysis system according to claim 1, wherein the hardware processor:
selects a plurality of arbitrary border pixels from the extracted border pixels;
connects the selected border pixels to one another with a straight line or a curve, thereby generating a border line; and
applies a color to the border line, thereby generating the border between the groups.

6. The dynamic analysis system according to claim 4, wherein the hardware processor applies, to the border generated based on the border pixels, the color for the group to which the border pixels belong.

7. The dynamic analysis system according to claim 1, wherein the hardware processor:
superimposes, on the border generated based on the border pixels, a numerical value for the group to which the border pixels belong, the border being superimposed on the image not subjected to the classification, thereby generating the combined image; and
causes the output device to output the combined image.

8. The dynamic analysis system according to claim 1, further comprising an operation unit through which a user operation is input, wherein
the output device is a display, and
when the border displayed on the display is specified through the operation unit, the hardware processor causes the display to highlight a border that belongs to, among the groups, a group to which the specified border belong.

9. The dynamic analysis system according to claim 1, wherein
each of the dynamic image and the analysis result image is constituted of a plurality of frame images, and
the hardware processor:
performs the determination, the classification, the extraction and the generation with respect to each of the frame images of the dynamic image or the analysis result image; and
superimposes the borders generated with respect to the respective frame images on the respective frame images of, between the dynamic image and the analysis result image, the image not subjected to the classification, thereby generating the combined image; and
causes the output device to output the combined image.

10. The dynamic analysis system according to claim 9, wherein the hardware processor:
superimposes, on one of the frame images of the image not subjected to the classification, the borders generated with respect to the respective frame images and belonging to an arbitrary group among the groups, thereby generating the combined image; and
causes the output device to output the combined image.

11. The dynamic analysis system according to claim 1, wherein the hardware processor classifies the analysis result image.

12. The dynamic analysis system according to claim 1, wherein the dynamic image is analyzed for a perfusion function or a ventilation function.

* * * * *